(12) United States Patent
Seetamraju et al.

(10) Patent No.: US 11,474,506 B2
(45) Date of Patent: Oct. 18, 2022

(54) ABILITY TO HAVE MULTIPLE VERSIONS OF A PROCESS ELEMENT IN A PROCESS PLANT SIMULTANEOUSLY

(71) Applicant: Honeywell International Inc., Morris Plains, NJ (US)

(72) Inventors: Rajashree Seetamraju, Harleysville, PA (US); Muslim Gulam Kanji, Orefield, PA (US); Cathleen Kilpatrick, Bethlehem, PA (US)

(73) Assignee: Honeywell International Inc., Charlotte, NC (US)

( * ) Notice: Subject to any disclaimer, the term of this patent is extended or adjusted under 35 U.S.C. 154(b) by 139 days.

(21) Appl. No.: 16/714,263

(22) Filed: Dec. 13, 2019

(65) Prior Publication Data
US 2021/0181724 A1   Jun. 17, 2021

(51) Int. Cl.
*G05B 19/418* (2006.01)
(52) U.S. Cl.
CPC ............ *G05B 19/4188* (2013.01); *G05B 2219/31001* (2013.01)

(58) Field of Classification Search
CPC .............. G05B 19/4188; G05B 2219/31001
See application file for complete search history.

(56) References Cited

U.S. PATENT DOCUMENTS

| | | | |
|---|---|---|---|
| 6,598,180 B1* | 7/2003 | Dryfoos | G06F 11/3664 717/124 |
| 2004/0199925 A1* | 10/2004 | Nixon | G05B 19/4188 719/315 |
| 2014/0100668 A1* | 4/2014 | Jundt | G05B 19/4188 700/11 |
| 2016/0246793 A1* | 8/2016 | Alfredsson | H04W 4/18 |

* cited by examiner

*Primary Examiner* — Chad G Erdman
(74) *Attorney, Agent, or Firm* — Paschall & Associates, LLC; Mark Goldberg

(57) ABSTRACT

Multiple versions of a process element in a process plant may run at the same time in different sub-systems of the plant such as configuration system, display system, and run time system. The ability to run multiple versions of process elements allows for more flexibility in production and reduces the time and costs in changes in product production. It is now possible to reduce auditing costs by performing an audit only on differences between versions instead of the entire process element.

15 Claims, 2 Drawing Sheets

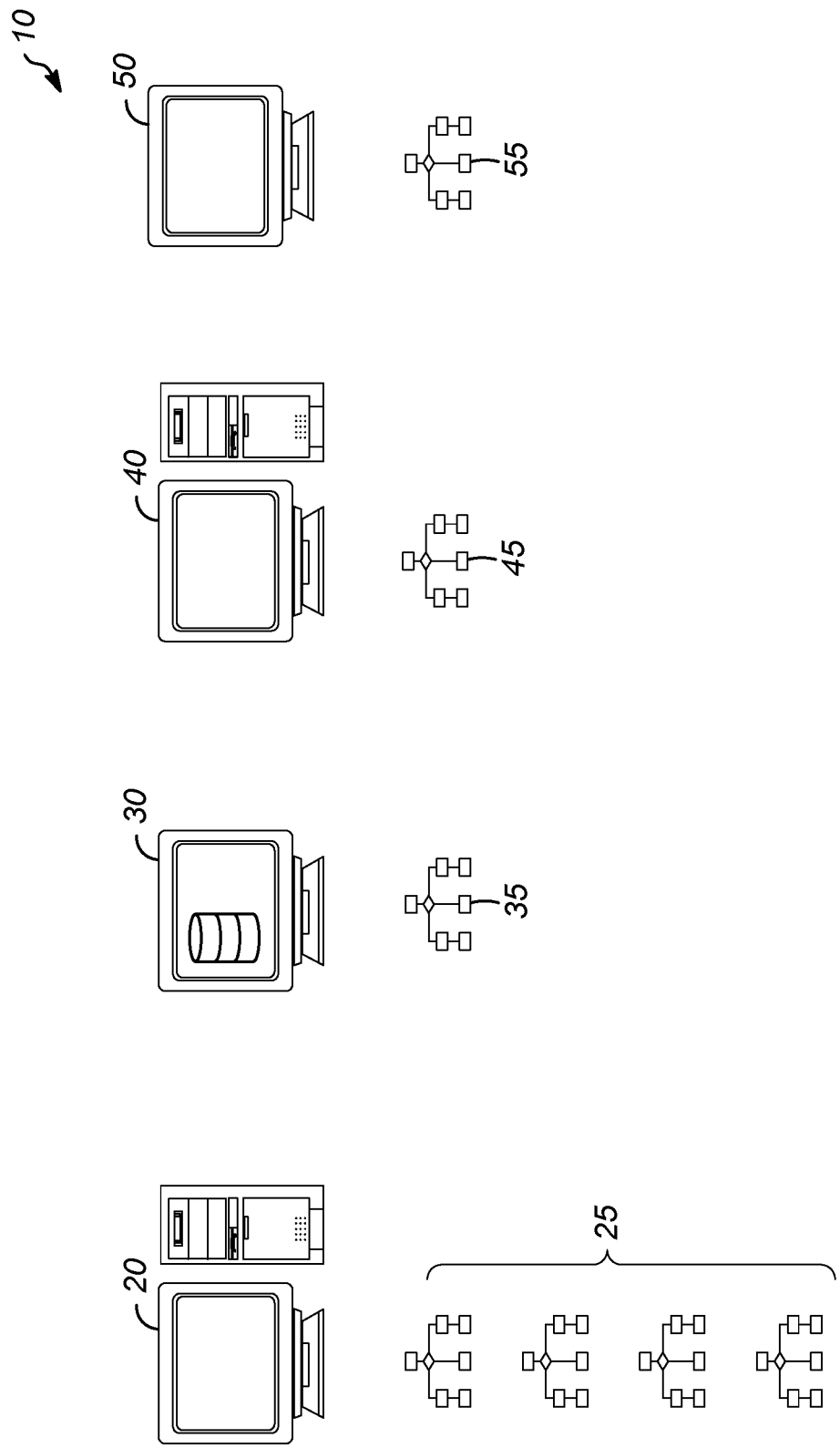

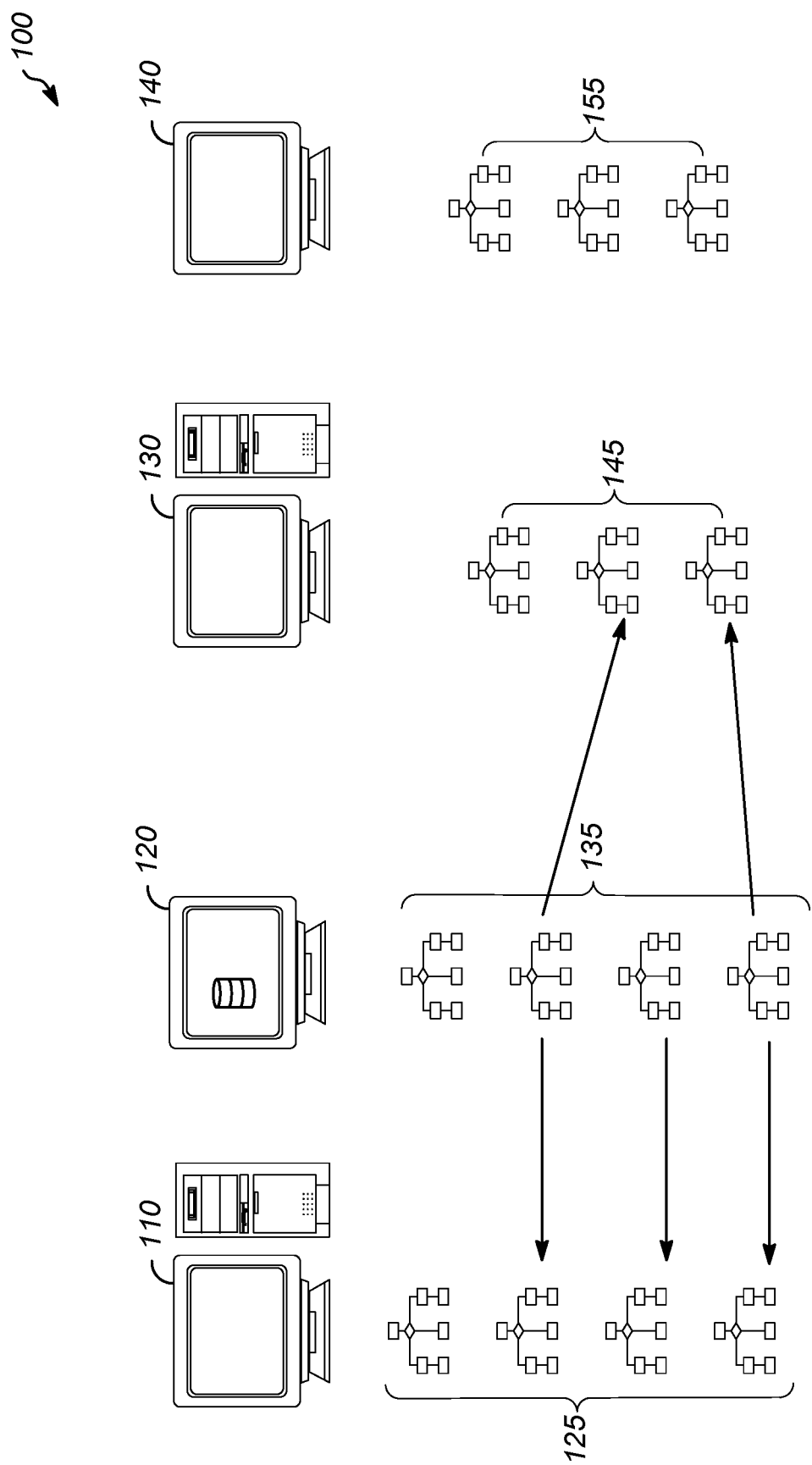

ABILITY TO HAVE MULTIPLE VERSIONS OF A PROCESS ELEMENT IN A PROCESS PLANT SIMULTANEOUSLY

The disclosure relates to the existence of multiple versions of a process plant element in a process plant that consists of various sub-systems such as configuration systems, display systems, run time systems and others. The process plant elements represent the elements that are used to control the plant. The process elements can be managed using a version control tool. At the present time, there can only be one version of a process plant element anywhere in the process plant (both at build and run time environments).

During the life cycle of a plant, there is a need to modify the process plant element numerous times and modifications should be visible in various sub-systems of the process plant. This needs to be done with minimal downtime to ideally no downtime, if possible, to maximize productivity. However, with current systems only allowing one version of the process plant element to be present at one time, it is not possible to do so prior to the present invention.

The ability to create multiple versions of a process element and to make it accessible in all of the sub-systems of a process plant at the same time is a need that this disclosure is trying to solve. This would help maximize the productivity of a process plant as the plant can continue to run with old versions of the process element as the new versions are being developed and deployed simultaneously without any interruption in operations.

SUMMARY

A method of operating a process plant is provided, comprising assigning a plurality of process elements to said process plant, wherein said method of operating includes a version control system, a build time environment, a run time environment and a reporting time period; and then assigning a different process element to at least one of said version control system, said build time environment, said run time environment or said reporting time period. The method may involve the process plant is producing a food or a pharmaceutical product. Other products are contemplated within the scope of the invention. The method may involve monitoring the process elements that are operating during a period of time or recording differences between said process elements. A different version of a process element may be entered into one or more of said version control system, said build time environment, or said run time environment. The plurality of process elements are functional to operate said process plant to produce products that differ by concentrate or by type of product. The process may be audited at any point of time including during operation of the process plant. The plurality of process elements are assigned to the version control system.

Another embodiment involves a system for operating a process plant, said system comprising a version control system configured for storing more than one process element, a build time environment and a run time environment. The system includes a reporting system that is configured to monitor said version control system, said build time system and said run time environment. The process plant is producing a food or a pharmaceutical product or some other product. The reporting system is configured to measure differences between process elements producing different products and to audit operation of said process plant at any point in time. More than one process element may be operating at the same time. The s plurality of process elements are functional to operate said process plant to produce products that differ by concentrate or by type of product.

The embodiments described herein relate to process elements in industrial processes including the chemical, food and pharmaceutical industries. Some of these industries are highly regulated and must meet auditing standards. In a heavily audited process plant the audit process is expensive. Today, the audit process happens offline while only one version of a process element can exist at any given point of time. With the ability to create multiple versions of a process element or different process elements, the audit process can now happen at any time. It is now feasible with the current invention to perform an audit only on differences between versions instead of the entire process element. This minimizes the cost and time of auditing a process element for any changes, thereby increasing the revenue for the user of the system. This becomes a significant advantage over prior art systems.

BRIEF DESCRIPTION OF THE DRAWINGS

FIG. 1 shows a pictorial representation of a prior art process element during the stages of operation of a process plant.

FIG. 2 shows a pictorial representation of a process plant having multiple versions of process elements present.

DETAILED DESCRIPTION

This disclosure allows the user to configure and use multiple versions of a process element in a process plant. The system handles multiple versions of a process element, without impact to running operations, audit trails, and reports. In addition, the system and method provides the technical ability to provide a product which allow the users to continuously improve their process elements without impact to their production This invention allows the user to deploy new versions of process elements at any time without having to wait until the process element created from the older versions has finished its execution. This allows users of the system and method described herein to continue improving the quality and quantity of their products, make usage of equipment more efficient, and allow production of a greater variety of products, therefore having the potential to produce more revenue This disclosure relates to process elements for the food and pharmaceutical industries as well as other industries. Some of these industries are highly regulated and must meet auditing standards. In a heavily audited process plant the audit process is expensive. Today, the audit process happens offline while only one version of a process element can exist at any given point of time. With the ability to create multiple versions of a process element or different process elements, the audit process can happen at any time and with the support to do audit only on differences between versions instead of the entire process element. This minimizes the cost and time of auditing a process element for any changes, thereby increasing the revenue for the user of the system.

FIG. 1 presents a pictorial representation of how a process element exists in a process plant 10 in a prior art system. In FIG. 1, a process element 25, 35, 45 or 55 is a process to make a product. There are four points in time that are important. There is a version control system 20 which stores the information as to any of the products that may be made using the particular system. The version control system will include all of the possible process elements which may be modified or added to at any time. The information is stored in a computer or other computing device having an input means for inputting the process element, an output or communication means to communicate to the equipment within the process plant and to monitor production. Other conventional equipment is available including displays to monitor the process. There may be separate computing equipment for each stage of the process or one system to control the entire system. Then there is the build time environment 30 when the preparation is made to produce a particular product. While the product is being made, there is the run time environment 40 and then at the end there is time for reporting 50 the results of the production of the product. At the start of a production run or execution time, a user needs to make a decision as to the particular product that is to be made and select the appropriate ingredients. There is a possibility between the build time and runtime reports (based on when the ingredients were selected), auditing of the entire process of making the product can be expensive. If the user wants to make changes to the process element to make the product from start to finish, the process element needs to be modified at build time and made accessible at execution and reporting time. With this change, the user loses the ability to make a generic product, as there is a change to the process element. A simple example of the invention would be a generic process for the production of juice. One version of the process would be to make orange juice, another version would be to make apple juice, pineapple juice, or any other desired type of juice. In the pharmaceutical industry, an example of a first product could be to make a generic drug while other products could be different strength doses or even different drugs. The possible flexibility of the process is desired as shown in FIG. 2.

FIG. 2 presents a pictorial representation of how multiple versions of process elements can exists in a process plant. The new concept is captured/illustrated FIG. 2. In one of the above examples, the product is juice. While that process element continues to exist in the plant, the user has flexibility to make changes to the process element and create versions four, five and six that are used to make orange juice, apple juice and lemonade, respectfully. With this feature, it is more efficient to create new version of process element to make other flavors/juices with minimal cost. The process plant 100 has a version control system 110 which may have several process elements 125. The difference from FIG. 1 is that build time environment 120 has multiple possible process elements 135, run time environment 130 has multiple process elements 145, and reporting time 140 has multiple process elements 155. In this system multiple versions of the process elements can exist at any given point of time.

The invention claimed is:

1. A method of operating a process plant comprising:
    assigning a plurality of process elements to said process plant, wherein said method of operating includes a version control system, a build time environment, a run time environment and a reporting time period; and
    assigning the plurality of process elements includes assigning at least one different process element to said version control system, said build time environment, said run time environment and said reporting time period to create different versions of at least one of the plurality of process elements, wherein the different versions of the at least one of the plurality of process elements exist simultaneously, and
    wherein the different process element is a process to make a product in the process plant.

2. The method of claim 1 wherein said process plant is producing a food or a pharmaceutical product.

3. The method of claim 1 further comprising monitoring the process elements that are operating during a period of time.

4. The method of claim 3 wherein said monitoring of said process elements records differences between said process elements.

5. The method of claim 1 wherein a different version of a process element is entered into one or more of said version control system, said build time environment, or said run time environment.

6. The method of claim 2 wherein said plurality of process elements are functional to operate said process plant to produce products that differ by concentrate or by type of product.

7. The method of claim 1 wherein said process may be audited at any point of time including during operation of said process plant.

8. The method of claim 1 wherein said plurality of process elements are assigned to said version control system.

9. A system for operating a process plant, said system comprising:
    a version control system configured for storing a plurality of process elements, a build time environment, a run time environment and a reporting time period,
    wherein the system is configured to assign the plurality of process elements including assigning at least one different process element to said version control system, said build time environment, said run time environment and said reporting time period to create different versions of at least one of the plurality of process elements, wherein the different versions of the at least one of the plurality of process elements exist simultaneously, and
    wherein the process element is a process to make a product in the process plant.

10. The system of claim 9 wherein a reporting system is configured to monitor said version control system, said build time environment, and said run time environment.

11. The system of claim 9 wherein said process plant is producing a food or a pharmaceutical product.

12. The system of claim 10 wherein said reporting system is configured to measure differences between process elements producing different products.

13. The system of claim 10 wherein said reporting system is configured to audit operation of said process plant at any point in time.

14. The system of claim 9 wherein more than one process element may be operating at same time.

15. The system of claim 9 wherein said plurality of process elements are functional to operate said process plant to produce products that differ by concentrate or by type of product.

* * * * *